March 31, 1970   L. D. SHECKLER   3,504,205
LIQUID LEVEL SENSING APPARATUS
Filed April 3, 1967   2 Sheets-Sheet 1

INVENTOR.
LYLE D. SHECKLER
BY
Fraser, Wilson & Fraser
ATTORNEYS

United States Patent Office 3,504,205
Patented Mar. 31, 1970

3,504,205
LIQUID LEVEL SENSING APPARATUS
Lyle D. Sheckler, Toledo, Ohio, assignor to The Sinclair Manufacturing Company, Toledo, Ohio, a corporation of Ohio
Filed Apr. 3, 1967, Ser. No. 628,033
Int. Cl. H03k 1/00
U.S. Cl. 307—308    9 Claims

ABSTRACT OF THE DISCLOSURE

A fluent material handling apparatus having an element of control which operates in response to a condition in the fluent material receiver to terminate the flow of the fluent material to the said receiver.

BACKGROUND OF THE INVENTION

(1) Field of the invention

An electrical circuit for sensing the level of a fluent material within a receiver which is responsive to terminate the flow of the fluent material when a predetermined level is obtained.

(2) Description of the prior art

Certain prior art systems for filling receivers with a fluent material have employed pressure filling means wherein the fluent material outlet or nozzle must be mechanically sealed to the fluent material aperture of the receiver. The mechanical sealing means typically applied a generally downward pressure on the receiver which, if the receiver were formed of a light wall flexible plastic material, would tend to deform the same. The deformation of the receiver would tend to cause an overfilling or an under-filling condition of the fluent material product. Since the system was a pressure system, the receiver could also be deformed by virtue of the pressure established within the receiver relative to the ambient pressure.

A typical pressure filling system is illustrated and described in the U.S. Patent 3,263,711 entitled "Receptacle Filling Apparatus," Herman Laub.

To overcome the problem of deformation of the receivers in the pressure-type filling systems, the receivers or containers were fabricated from material having greater wall thicknesses than normally required to withstand the stresses caused by the weight of the fluent material product. Manifestly, this resulted in additional expenses and costs in connection with the use of the filling systems.

Further, the above referred to filling systems have employed electrical systems for sensing level of a liquid or fluent material in a receiver. Such systems have employed pressure means for displacing a bath of a conductive media, such as for example liquid mercury, to close an associated electrical circuit to effect a termination in the flow of the fluent material at a predetermined level. Such systems when employed in filling apparatus which are subjected to vibratory movements may be caused to give false signals by the unwanted movement of the conductive media.

SUMMARY OF THE INVENTION

The invention relates to a system for filling a receiver or a container to a predetermined level with a conductive fluid wherein a pair of conductive electrodes, spaced by a nonconductive solid, is maintained in the container in a position to be bridged by the fluid when it reaches the predetermined level and in response to the bridging to produce an electrical signal, the improvement comprising an electrical circuit means for discriminating between a range of relatively high resistance values and a range of relatively low resistance values between the spaced electrodes.

It is a general object of the invention to overcome the above-stated problems of the prior art and produce a system for accurately filling a receiver or container with a fluent material to a predetermined level wherein there is no need for the receiver or container to be fabricated from material any stronger than to withstand the stresses imposed thereon by the weight of the fluent material product alone.

DESCRIPTION OF PREFERRED EMBODIMENT

Figure 1:
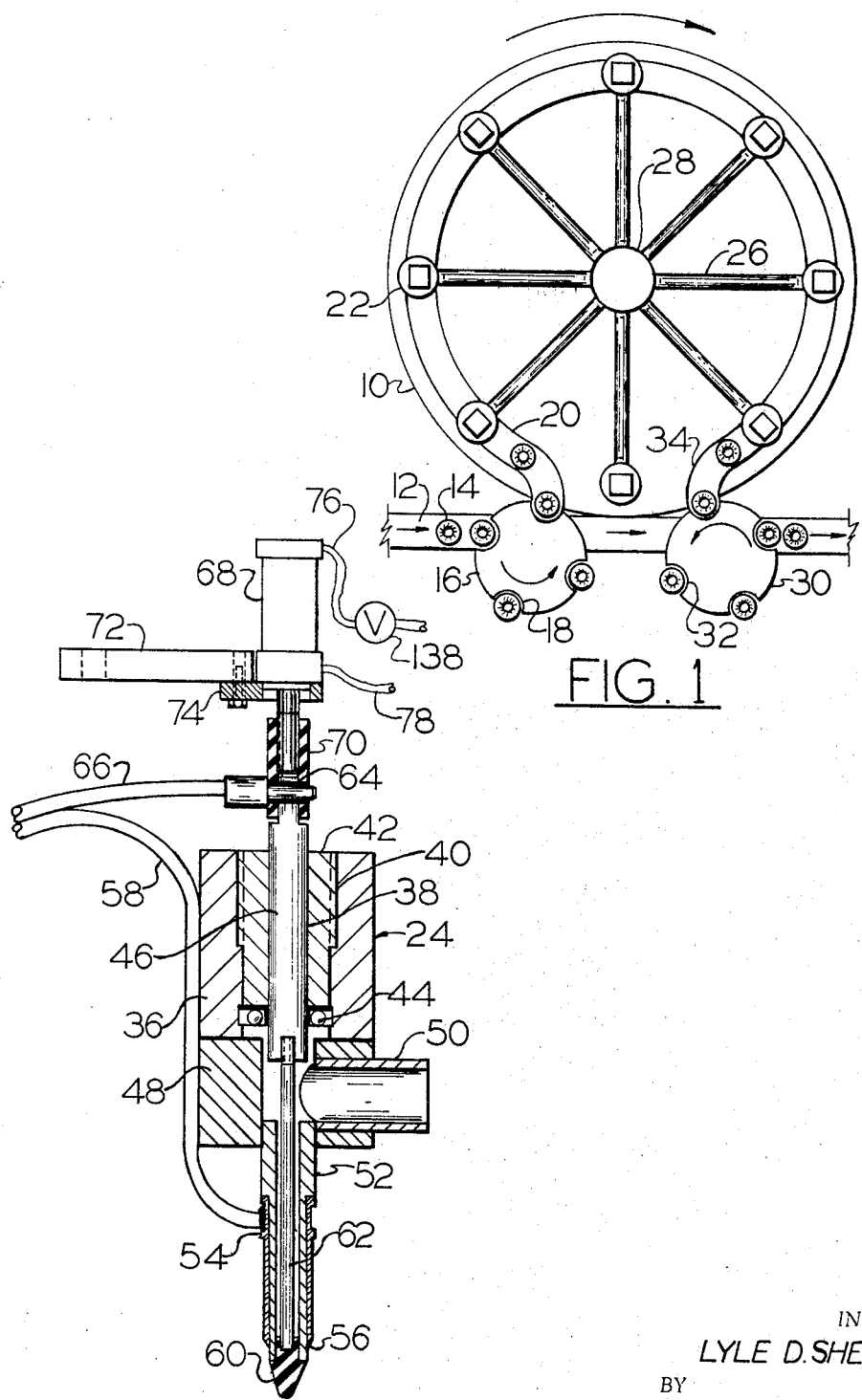
FIGURE 1 is a diagrammatic top plan view of a receptacle filling apparatus employing the concepts and structure of the invention.

Referring to the drawings, there is shown an automatic receptacle filling apparatus wherein a supply of empty receptacles is fed to a filling station at which point the receptacles are filled with a fluent material, and thence the filled receptacles are typically conveyed to capping, labeling, and packaging stations. The automatic filling machine includes a platform or carousel base member 10 mounted to rotate about a vertical axis. A conveyor 12 is employed to convey receptacles 14 along a path generally tangential with respect to the circumference of the platform 10. The receptacles 14 may be transferred from the conveyor 12 to the platform 10 by any number of different and perfectly adequate means, one of which is illustrated as a smaller platform 16 adapted to rotate about a vertical axis in a direction preferably opposite to that of the platform 10. The platform 16 may be provided with a plurality of spaced contoured cavities 18, for example, each of which is adapted to receive a receptacle and support the same as the platform rotates to a position where a directional gate 20 guides the receptacle off the platform 16 and onto the platform 10. The operation of the platforms 10 and 16 are properly synchronized so that the empty receptacles 14 are transferred to the platform 10 so as to be positioned directly under a filling nozzle assembly 22. A filling machine may have any number of filling nozzle assemblies 22. The illustrated embodiment only shows eight filling stations, for ease of illustration and understanding. Each of the filling stations 22 includes a filling nozzle 24 which rotates about a vertical axis simultaneously with the platform 10 and each filling nozzle 24 is typically sequentially cammed or otherwise caused to be elevated withdrawing the nozzle from the receptacle after it has been filled. Thereafter, the filling nozzle 24 is lowered into the empty receptacle 14 transferred from the conveyor 12 by the smaller platform 16.

When the nozzle 24 is satisfactorily positioned in the empty receptacle 14, the normally closed nozzle valve, to be explained in greater detail hereinafter, is opened allowing the fluent material, such as a liquid detergent, to flow into the empty receptacle. Each of the nozzles 24 is connected to a supply of fluent material through a flexible hose 26 and a manifold 28 all of which rotate with the platform 10. By the time the platform 10, the associated receptacle 14, and the filling nozzle 24 having rotated through approximately three-fourths of a revolution, the receptacle is filled and the filling nozzle 24 is moved upwardly to move the nozzle out of the neck of the receptacle. The continued rotational movement of the platform 10 causes the filled receptacle to be transferred onto a second smaller platform 30 provided with a plurality of vertically extending spaced cavities 32 by a directional gate 34 which suitably guides the receptacles. The platform 30 is rotated in the same direction as the platform 10 and carries the filter receptacle to the conveyor 12 which transports the filled containers to the capping, labeling, and packaging stations positioned at remote downstream positions.

Figure 2:
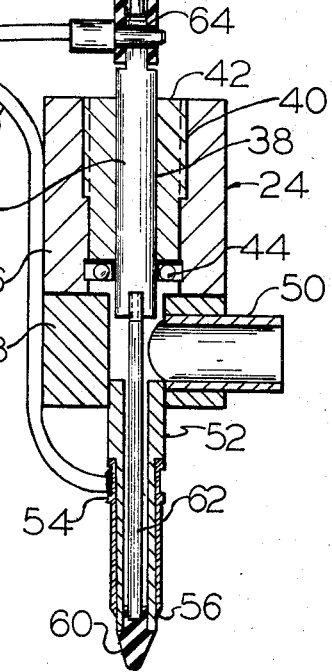
FIGURE 2 is an elevational view partly in section of a filling nozzle which may be used in connection with the invention.

While the structure of the filling nozzle may be of a variety of different constructions, a typical construction is illustrated in FIGURE 2. The filling nozzle 24 consists of the main body 36 having a cylindrical bore 38 extending axially therethrough. The upper end of the cylindrical bore is provided with an internally threaded section 40 which is adapted to receive an externally threaded bushing or bearing sleeve 42. The lower or inner end of the sleeve 42 carries a packing or sealing means 44 which aids in producing a fluid-type sliding fit between the main body 36 and a rod-like plunger 46 formed of electrically conductive material. Disposed below the main body 36, there is a hollow depending portion 48 adequately affixedly secured to the main body 36 and having a laterally extending fluid inlet connection 50 communicating with the hollow interior thereof. The outlet end of the flexible hose 26 is connected to the inlet connection 50 to provide communication between the manifold 28 (FIGURE 1) and the interior of the depending portion 48.

A downwardly depending electrically insulating sleeve 52 is fixedly positioned to communicate with the interior of the depending portion 48 and is adapted to contain an encircling electrode 54 preferably having a tapered lower end 56. Electrode 54 is coupled to a comparator detector circuit, to be fully explained hereinafter, through an electrical conductor 58.

Disposed in seating relation with the lower or outlet end of the sleeve 52, there is a valve plug 60 mechanically connected to the plunger 46 by a shaft 62. The plug 60 is contoured to produce a fluid-tight sealing relation with the outelt end of the sleeve 52 when in the position illustrated in FIGURE 2.

The plug 60, the shaft 62, and the plunger 46 are made of electrically conductive material and electrically coupled to the comparator circuit to be fully explained hereinafter, through an electrical connection 64 and an associated electrical conductor 66. The electrical connection 64 may be of any of the well known types, such as for example a detachable connector, suitably in electrical contact with the upper end of the plunger 46.

The plunger 46 is connected to the piston rod of a pneumatic cylinder 68 or other actuating device through a linkage connection 70 which is preferably formed of an electrically insulating material. The pneumatic cylinder 68 is fixedly secured to the machine by a brace member 72 and an associated mounting plate 74. It will be appreciated that while mention has been made that the cylinder 68 is pneumatic, satisfactory results could likewise be achieved through the employment of other pressure fluids for actuating the assembly. The pneumatic cylinder 68 is provided with inlet and outlet line 76 and 78 for the admission and expulsion of the pressure fluid.

Figure 3:
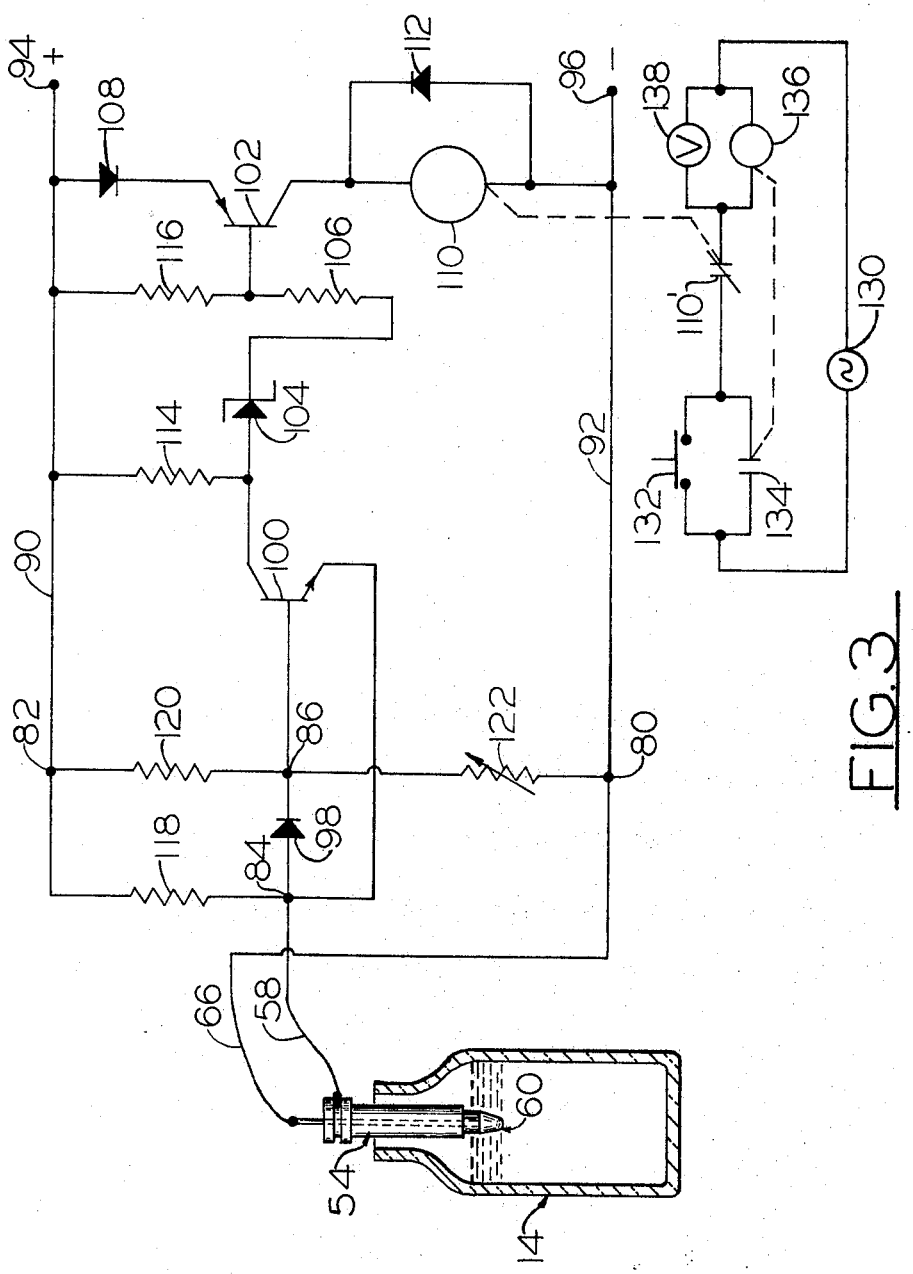
FIGURE 3 is a schematic circuit diagram of the circuit of the invention.

The actuating circuitry for the nozzle 24 illustrated in FIGURE 2 is the electrical circuit illustrated in FIGURE 3. The circuit consists essentially of a bridge-type network having input terminals 80 and 82, and output terminals 84 and 86. Connected to the input terminals 80 and 82 through electrical conductors 92 and 90 are the terminals 94 and 96 of a source of direct electrical potential. A diode 98 is connected across the output terminals 84 and 86. Also, the output terminal 84 is connected to the emitter of a NPN type transistor, generally indicated by reference numeral 100; and the output terminal 86 is connected to the base of the transistor 100. The collector of the transistor 100 is connected to the base of a PNP transistor, generally indicated by reference numeral 102 through a Zener diode 104 and a resistor 106.

The emitter of the transistor 102 is connected to the power line 90 through a diode 108, while the collector of the transistor 102 is connected to the power line 92 through a relay 110 which has a diode 112 connected thereacross.

A resistor 114 is connected between the collector of the transistor 100 and the power line 90, while a resistor 116 is connected between the base of the transistor 102 and the power line 90.

Connected between the terminals 82 and 84 of the bridge network is a first fixed resistor 118. Connected between the terminals 82 and 86 is a second fixed resistor 120. Connected between the terminals 80 and 86 is a manually adjustable variable resistor 122. The terminal 80 is connected to the electrode 60 of the nozzle 24 through the conductor 66, while the terminal 84 is connected to the electrode 54 of the nozzle 24 through the conductor 58.

The relay 110 has an associated normally closed switch contact 110′ connected to the armature thereof. The switch contact 110′ is coupled into an alternating current valve control circuit consisting of a source of alternating potential 130; a normally open switch contact 132 which is in parallel with a normally open contact 134 of a relay 136 and solenoid actuated normally closed valve 138 connected in parallel with the relay 136.

It will be appreciated that normally an open circuit condition exists between the electrodes 54 and 60 which form one arm of the bridge network and the resistance will be varied by a conductive fluid introduced into the receptacle into which the associated nozzle 24 is inserted. In operation, when the ratio of the resistance between the electrodes 60 and 54 to the value of the resistance of the resistor 118 is greater than the ratio of the value of the resistance 122 to the value of the resistor 120, current will be caused to flow through the diode 98; however, when there is an "open" circuit condition, the diode 98 clamps the circuit effectively producing a voltage across the terminals 80 and 84 which is lower than the line voltage. This condition also reduces any current flow between the electrodes 54 and 60 thereby reducing galvanic action on the nozzle assembly, thereby militating against any tendency of the electrode 54 in being etched away.

When the system is placed in operation, the presence of the receptacle 14 in a proper position on the platform 10 for filling is initially sensed by the switch 132 which is caused to be momentarily closed initiating the duty cycle of the apparatus. At this time, the alternating current energizes the relay 136 closing the normally open contact 134 holding the alternating current circuit in a state of energization. The nozzle 24 is positioned within the neck of the receptacle 14, and the valve 138 is energized permitting air under pressure to be introduced into the pneumatic cylinder 68 through the inlet line 76 causing the piston rod thereof to move outwardly forcing the plunger 46, the shaft 62, and the electrode 60 downwardly, thereby permitting the fluid to flow through the inlet 50, the hollow interior of the depending portion 48, the sleeve 52 and thence into the receptacle 14. As the fluid content of the receptacle increases, the fluid therein first contacts the electrode 60 and then the lower portion 56 of the electrode 54. The circuit between the terminals 80 and 84 is then completed causing the circuit to function in the following fashion to effectively cut-off the flow of air to the pneumatic cylinder 68 allowing it to return to its normal position shutting off the flow of fluid through the nozzle 24.

When the electrodes 54 and 60 are in contact with the conductive fluid within the receptacle 14, a current is caused to flow from terminal 82 through the resistor 120 through the base to the emitter of the transistor 100 and thence to the electrode 54 through the conductive fluid within the receptacle to the electrode 60 and thence to the power line 92. Simultaneously, a second current path is established from the power line 90 through the diode 108, the emitter to the base of the power transistor 102, the resistor 106, the Zener diode 104, the collector to the emitter of the transistor 100, and is thence superimposed on the first mentioned current.

The Zener diode 104 and the leakage load resistor 114 cooperate to isolate any leakage current which might normally pass through the transistor 100. The voltage across the resistor 114 is less than the voltage drop necessary to cause the Zener diode 104 to conduct, if the conditions were otherwise, a current might pass from the emitter to the collector of transistor 102 causing a false signal shutting off the flow of fluid through the nozzle 24.

At the same time, a third current is caused to flow from the power line 90 through the diode 108, the collector to the emitter of the transistor 102, the relay 110, and thence to the power line 92. This current flow energizes the relay 110 which is connected to the normally closed contacts 110' opening the same and interrupting the current flow through the valve 138 thereby cutting off the flow of air to the pneumatic cylinder 68. When the air supply is cut off to the cylinder 68, the plunger 46 is drawn upwardly to simultaneously move the electrode 60 into a fluid-tight relation with the outlet end of the sleeve 52 thereby cutting off the flow of fluid through the nozzle 24. At this point, the nozzle assembly 22 may be moved upwardly out of the receptacle 14 and rotated to a position where it is lowered into an empty receptacle positioned on the platform 10 from the conveyor 12.

It has been found that highly satisfactory results have been achieved in the preferred embodiment by utilizing the following types and values for the various circuit parameters:

| | |
|---|---|
| 98—1N2069 | 112—1N2069 |
| 100—2N3053 | 114—82000 ohms |
| 102—2N1546 | 116—4700 ohms |
| 104—HEP 101 Motorola | 118—4700 ohms |
| 106—4700 ohms | 120—3000 ohms |
| 108—1N2069 | 122—0 to 1000 ohms |

It will be understood that the systems may be adjusted for use with fluid materials of different electrically conductive properties by varying the adjustable resistor 122 which in turn varies the balance of the bridge network. Therefore, the system may be very readily adjusted to accommodate for different products which are to be packed in subsequent runs.

While specific mention has been made that the means for actuating the nozzle assembly included a pneumatic cylinder 68, it will be appreciated that by making only a few general modifications, the pneumatic cylinder 68 could be replaced by a solenoid.

According to the provisions of the patent statutes, I have explained the principles and mode of my invention and have illustrated and described what I now consider to represent its best embodiment. However, I desire to have it understood that, within the scope of the appended claims the invention may be practiced otherwise than as specifically illustrated and described.

What I claim is:

1. A resistive bridge having four legs and including an input diagonal, a source of electrical energy connected across said input diagonal, an output diagonal, an asymmetrically conductive current sensing means connected across said output diagonal and poled to pass current in a given direction, an asymmetrically conductive element connected across said sensing means and poled to pass current in a direction opposite said given direction, and a pair of spaced electrodes adapted for immersion in an electrolyte and located in one leg of said bridge, an insulating body between said electrodes, said bridge actuating said sensing means when the resistance between said electrodes is at a relatively low level and said conduction in said output diagonal limiting the current through an electrolytic action at said electrodes.

2. A combination according to claim 1 wherein said source supplies direct current to said bridge.

3. A combination according to claim 1 wherein said sensing means is a semiconductive translating device.

4. A combination according to claim 1 wherein said current sensing means is an n-p-n transistor having a base-emitter circuit in said output diagonal.

5. A combination according to claim 2 wherein said electrodes are on the more negative side of said output diagonal.

6. A combination according to claim 5 including a fill spout for electrolyte and wherein said electrodes are a liquid level sensing means for said electrolyte and integral with and vertically spaced on said fill spout.

7. A combination according to claim 1 wherein said sensing means discriminates between a high resistance between said electrodes as by electrolyte clinging to said insulation and a low resistance between said electrodes as by immersion of both electrodes below the free standing surface of a body of electrolyte.

8. A combination according to claim 4 including a load resistance of high resistance relative to the resistances of said bridge from the collector of said transistor to an input for said bridge, a p-n-p transistor, a Zener diode having its cathode connected to the load resistance-collector interconnection and its anode connected to the base of said p-n-p transistor whereby said diode provides a sharp transition from the n-o-n-responsive to the responsive state for said p-n-p transistor.

9. A resistive bridge having first and second input junctions and third and fourth output junctions, a source of electrical energy connected across said first and second junctions, a first resistance between said first and third junctions, a second resistance between said first and fourth junctions, an adjustable resistance between said second and fourth junctions, a first electrode connected to said third junction, a second electrode connected to said second junction, a body of insulation for electrically isolating said first electrode from said second electrode, an asymmetrically conductive sensing circuit connected between said third and fourth junctions and poled to favor conduction from said fourth to said third junction, an asymmetrically conductive device connected between said third and fourth junctions and poled to conduct from said third to said fourth junction whereby a current flows between said third and fourth junctions to inhibit electrolyte action at said electrodes when the resistance between said electrodes of a magnitude to cause a first ratio of said first resistance to said resistance between said electrodes to be less than a second ratio of said second resistance to said adjustable resistance and current flows in said sensing circuit when said first ratio is greater than said second ratio.

References Cited

UNITED STATES PATENTS

| | | | |
|---|---|---|---|
| 2,894,390 | 7/1959 | Talbot | 73—304 XR |
| 3,279,379 | 10/1966 | Klyce | 307—308 XR |
| 3,328,677 | 6/1967 | Naegele | 323—75 XR |
| 3,335,334 | 8/1967 | Albisser | 340—244 XR |
| 3,350,710 | 10/1967 | Bridges | 340—244 XR |
| 3,363,466 | 1/1968 | Guidi | 340—244 XR |

DONALD D. FORRER, Primary Examiner

JOHN ZAZWORSKY, Assistant Examiner

U.S. Cl. X.R.

73—304; 141—198; 307—253; 324—65; 328—1; 340—244